G. B. Markham,
Water Gate,
Nº 29,896.        Patented Sep. 4, 1860.
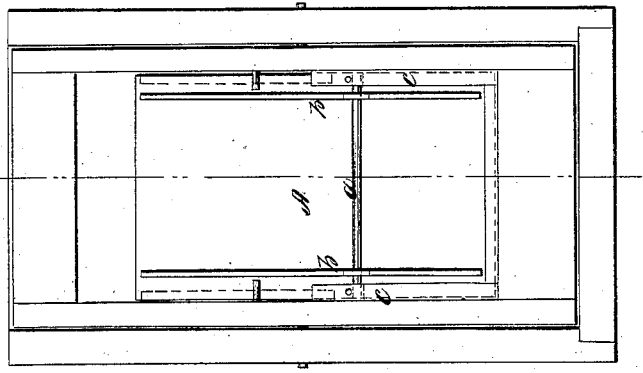
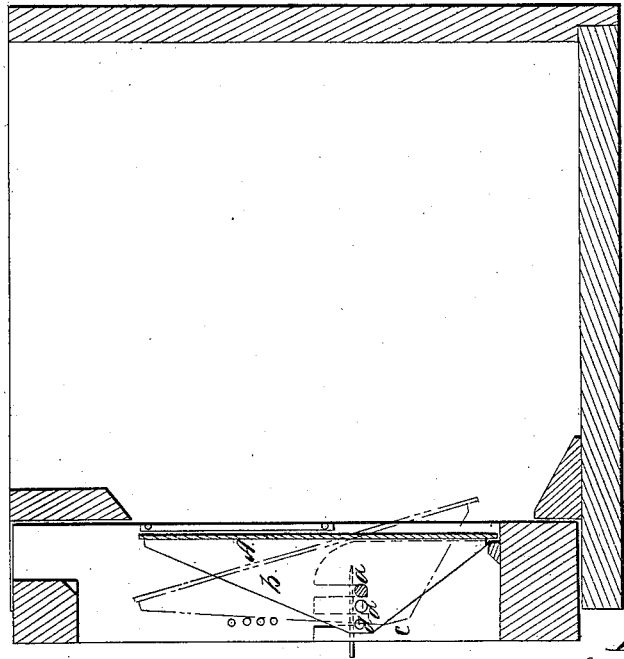
Witnesses:
J W Coombs
R S Spencer
Inventor:
G B Markham
per Munn & Co
Attorneys

UNITED STATES PATENT OFFICE.

GEORGE B. MARKHAM, OF MEADS MILLS, MICHIGAN.

SELF-ACTING FLOOD-GATE.

Specification of Letters Patent No. 29,896, dated September 4, 1860.

*To all whom it may concern:*

Be it known that I, G. B. MARKHAM, of Meads Mills, in the county of Wayne and State of Michigan, have invented a new and Improved Automatic Flood-Gate; and I do hereby declare that the following is a full, clear, and exact description of the same, reference being had to the accompanying drawing, forming a part of this specification, in which—

Figure 1 represents a longitudinal section of my invention taken in the plane indicated by the line $x$, $x$, Fig. 2. Fig. 2 is a front elevation of the same.

Similar letters in both views refer to corresponding parts.

The object of this invention is to arrange the gates especially in small streams, which are liable to swell considerably from a heavy shower, and to cause a break in the dam, in such a manner, that they are self opening as soon as the water reaches a certain high water mark; and my invention consists in arranging the gate to swing on a bar which is adjustable in two flanges so that the discharge opening which is formed as the water rises beyond a certain height, can be made larger or smaller as may be desired.

To enable those skilled in the art to make and use my invention, I will proceed to describe its construction and operation with reference to the drawing.

The gate A, which closes the aperture leading from a mill pond or channel to the original bed of the stream or creek, which supplies the water, is suspended from a bar $a$, which passes through flanges $b$, on the outside of the gate, and which has its bearings in lugs or ears $c$, on the side of the gate way. These flanges project more or less above the plane of the gate and they are provided with several holes $d$, to admit of adjusting the bar nearer to or farther from the gate. By this arrangement, if the gate swings on the bar, its lower edge is thrown up from the bottom or sole of the gateway as clearly shown in red outlines in Fig. 1, and an aperture of considerable capacity is formed, to allow the water to escape. In case of necessity the gate A, may be raised vertically like ordinary gates simply by withdrawing the pin which holds the bar $a$, down in lugs $c$. The gate is supported from the bar, in such a manner, that if the water rises above a certain high water mark, the pressure of the water on the gate itself is sufficient to open the same and to let the water escape below, and as soon as the water sinks down below that high water mark, its pressure on the lower portion of the gate closes the same, thus making the gate entirely automatic.

By the use of this gate the danger of a break in the dam is entirely avoided and there is no necessity that millers keep constantly watching lest a sudden rise in the stream might cause an injury to the dam. With my gate, no attention whatever is required and the water is not allowed to rise beyond the desired point.

Having thus fully described my invention, what I claim as new and desire to secure by Letters Patent, is—

The arrangement of the flanges $b$, and adjustable bar $a$, substantially as herein specified so that the size of the discharge opening can be regulated at pleasure.

GEORGE B. MARKHAM.

Witnesses:
C. B. PACKARD,
B. PACKARD.